(12) United States Patent
Bader et al.

(10) Patent No.: US 12,567,633 B2
(45) Date of Patent: Mar. 3, 2026

(54) IMPACT DAMPING DEVICE FOR A RECHARGEABLE BATTERY

(71) Applicant: Hilti Aktiengesellschaft, Schaan (LI)

(72) Inventors: Thomas Bader, Landsberg am Lech (DE); Matthias Doberenz, Obermeitingen (DE); Torsten Tussing, Obermeitingen (DE); Sören Schöpke, Igling (DE); Michael Brandner, Landsberg am Lech (DE)

(73) Assignee: Hilti Aktiengesellschaft, Schaan (LI)

( * ) Notice: Subject to any disclaimer, the term of this patent is extended or adjusted under 35 U.S.C. 154(b) by 535 days.

(21) Appl. No.: 18/015,787

(22) PCT Filed: Jul. 12, 2021

(86) PCT No.: PCT/EP2021/069289

§ 371 (c)(1),
(2) Date: Jan. 12, 2023

(87) PCT Pub. No.: WO2022/017846

PCT Pub. Date: Jan. 27, 2022

(65) Prior Publication Data

US 2023/0261302 A1 Aug. 17, 2023

(30) Foreign Application Priority Data

Jul. 22, 2020 (EP) .................................... 20187105

(51) Int. Cl.
| | |
|---|---|
| *H01M 50/242* | (2021.01) |
| *H01M 50/244* | (2021.01) |
| *H01M 50/247* | (2021.01) |

(52) U.S. Cl.
CPC ....... *H01M 50/242* (2021.01); *H01M 50/244* (2021.01); *H01M 50/247* (2021.01)

(58) Field of Classification Search
None
See application file for complete search history.

(56) References Cited

U.S. PATENT DOCUMENTS

| | | | | |
|---|---|---|---|---|
| 2008/0047724 A1* | 2/2008 | Fischer | ................ | B25D 17/043 |
| | | | | 173/162.2 |
| 2010/0294525 A1 | 11/2010 | Meixner et al. | | |

(Continued)

FOREIGN PATENT DOCUMENTS

| | | |
|---|---|---|
| CN | 102046334 A | 5/2011 |
| DE | 112014006502 T5 | 12/2016 |

(Continued)

OTHER PUBLICATIONS

Machine Translation WO-2018036720-A1 (Year: 2018).*

(Continued)

*Primary Examiner* — Wyatt P Mcconnell
(74) *Attorney, Agent, or Firm* — Davidson Kappel LLC

(57) ABSTRACT

A power tool, in particular a chipping hammer, having a housing and a battery interface device for releasably connecting at least one rechargeable battery to the power tool. An impact damping device is contained between the housing and the battery interface device, wherein the impact damping device contains at least one damping element which is arranged in a longitudinal extent perpendicularly to a working axis of the power tool.

19 Claims, 7 Drawing Sheets

(56)         References Cited

U.S. PATENT DOCUMENTS

| 2011/0073339 A1 | 3/2011 | Werner et al. |
| 2012/0171539 A1 | 7/2012 | Rejman et al. |
| 2017/0106518 A1 | 4/2017 | Takeuchi et al. |
| 2019/0001477 A1 | 1/2019 | Ullrich et al. |
| 2020/0215679 A1 | 7/2020 | Tamura et al. |

FOREIGN PATENT DOCUMENTS

| DE | 102016215660 A1 | 2/2018 | |
| DE | 102018210189 A1 | 12/2019 | |
| EP | 1882559 A1 | 1/2008 | |
| GB | 2486986 A | 7/2012 | |
| WO | WO 2017108414 A1 | 6/2017 | |
| WO | WO-2018036720 A1 * | 3/2018 | ........... B24B 41/007 |

OTHER PUBLICATIONS

International Search Report of PCT/EP2021/069289 dated Aug. 3, 2021.
B. H. Shuvalov: Automated machines and production lines for the food industry, Aug. 31, 1986, Light Industry Press, 447-448. See translation.

* cited by examiner

IMPACT DAMPING DEVICE FOR A RECHARGEABLE BATTERY

The present invention relates to a power tool, in particular a chipping hammer, having a housing and a battery interface device for releasably connecting at least one rechargeable battery to the power tool.

BACKGROUND

Battery-operated hammer drills and/or chipping hammers of the type mentioned at the beginning are known in principle from the prior art.

SUMMARY OF THE INVENTION

If rechargeable batteries are used to supply the power tool with electrical energy, it is advantageous that particular measures for protecting the rechargeable batteries against impacts, shocks and other mechanical actions are taken. Rechargeable batteries can be quite sensitive, or react in a fault-prone manner to such mechanical actions, such as shocks, impacts, etc., for example.

Protective apparatuses known from the prior art for rechargeable batteries on power tools are usually inadequate and/or too complex.

It is an object of the present invention to provide a power tool, in particular a chipping hammer, with which the abovementioned problem can be solved and in which the protection of rechargeable batteries connected to the power tool can be improved.

The present invention provides a power tool, in particular a chipping hammer, having a housing and a battery interface device for releasably connecting at least one rechargeable battery to the power tool.

According to the invention, a damping device for absorbing and damping impacts acting on the at least one rechargeable battery is contained between the housing and the battery interface device. As a result, mechanical actions on the rechargeable battery, for example shocks, impacts, etc., can be reduced and the rechargeable battery protected. The damping device can in this case also be referred to as an impact damping device. Furthermore, the damping device can also be used to reduce vibrations acting on the rechargeable battery.

According to a further advantageous embodiment of the present invention, it may be possible that the damping device contains at least one damping element, which is arranged in a longitudinal extent perpendicularly to a working axis of the power tool.

According to one advantageous embodiment of the present invention, it may be possible that the damping element is configured in a cylindrical manner and has primarily an oval cross-sectional area.

According to a further advantageous embodiment of the present invention, it may be possible that the at least one damping element has at least one axially extending groove on an outer lateral surface. As a result, the elasticity and consequently the damping effect of the damping element can be increased.

According to one advantageous embodiment of the present invention, it may be possible that the at least one damping element at least partially contains an elastic material. The elastic material may be an elastomer or rubber.

According to a further advantageous embodiment of the present invention, it may be possible that the at least one damping element is configured in the form of a spring element, in particular of a coil spring element.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to produce useful further combinations.

DETAILED DESCRIPTION

Figure 1:
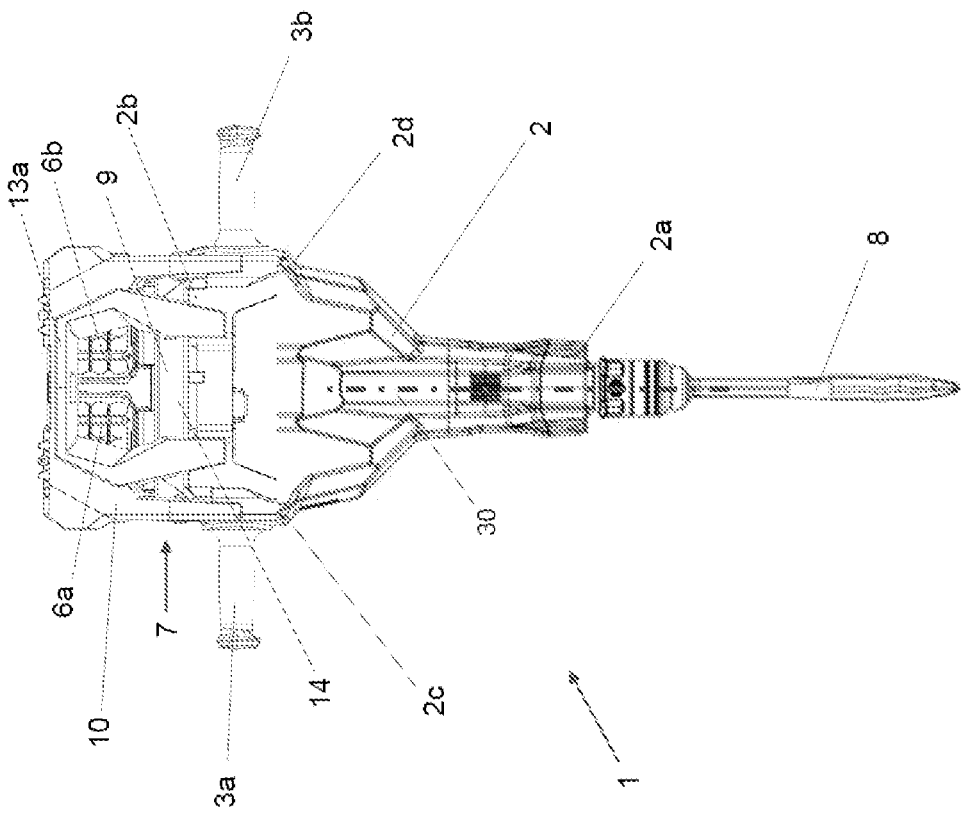
FIG. 1 shows a side view of a power tool configured as a chipping hammer.

FIG. 1 shows a power tool 1 in the form of a chipping hammer. It is also possible, however, for the power tool 1 to be configured in the form of a saw, a grinder, a screwdriver, a drill, a hammer drill or the like.

The power tool 1 in the form of a chipping hammer contains primarily a housing 2, a first handle 3*a*, a second handle 3*b*, a battery receptacle apparatus 7, and a tool fitting 5.

Contained inside the housing 2 are primarily an electric motor and an impact apparatus. The impact apparatus can also be referred to as an impact mechanism or impact mechanism apparatus. The electric motor and the impact apparatus are connected together such that pulse-like impacts are generated and transmitted to the tool fitting 5.

To supply the power tool 1 and in particular the electric motor with electrical energy, a first and second rechargeable battery 6*a*, 6*b* are connected to the power tool 1 via the battery receptacle apparatus 7. According to an alternative embodiment, it is also possible for only one rechargeable battery or more than two rechargeable batteries to be able to be used.

The housing 2 in turn has a first end 2*a*, a second end 2*b*, a left-hand side wall 2*c* and a right-hand side wall 2*d*. The first handle 3*a* is positioned on the left-hand side wall 2*c* and the second handle 3*b* is positioned on the right-hand side wall 2*d*. The tool fitting 5 is positioned at the first end 2*a* of the housing 2 and serves to receive and hold a tool 8.

In the exemplary embodiment that is illustrated in the figures, the tool 8 is configured in the form of a chisel. The battery receptacle apparatus 5 is positioned at the second end 2*b* of the housing 2 and serves to receive and hold the first and second rechargeable batteries 6*a*, 6*b*.

The battery receptacle apparatus 7 in turn contains a battery interface device 9 and a battery fall protection device 10.

The battery interface device 9 contains primarily a planar base plate 11, a first connection device 12*a* for receiving the first rechargeable battery 6*a*, and a second connection device 12*b* for receiving the second rechargeable battery 6*b*. The first and second connection devices 12*a*, 12*b* are positioned on the base plate 11 in the arrow direction Y. With the aid of the first and second connection devices 12*a*, 12*b*, the first and second rechargeable batteries 6*a*, 6*b* are able to be connected both mechanically and electrically to the power tool 1 so as to be releasable again. As a result of the first and second rechargeable batteries 6*a*, 6*b* being connected in a releasable manner, electrical energy can pass from the two rechargeable batteries 6*a*, 6*b* to the consumers (for example the electric motor) of the power tool 1. It is possible for only one rechargeable battery to be used to supply the power tool 1.

The battery fall protection device 10 serves primarily to protect the first and second rechargeable batteries from an impact or strike if the power tool 1 is dropped or falls over.

As illustrated in the figures (see, e.g., FIG. 3), the battery fall protection device 10 has primarily a first and a second guard bracket 13*a*, 13*b*. The guard brackets 13*a*, 13*b* can also be referred to as supporting frames or frames.

Figure 2:
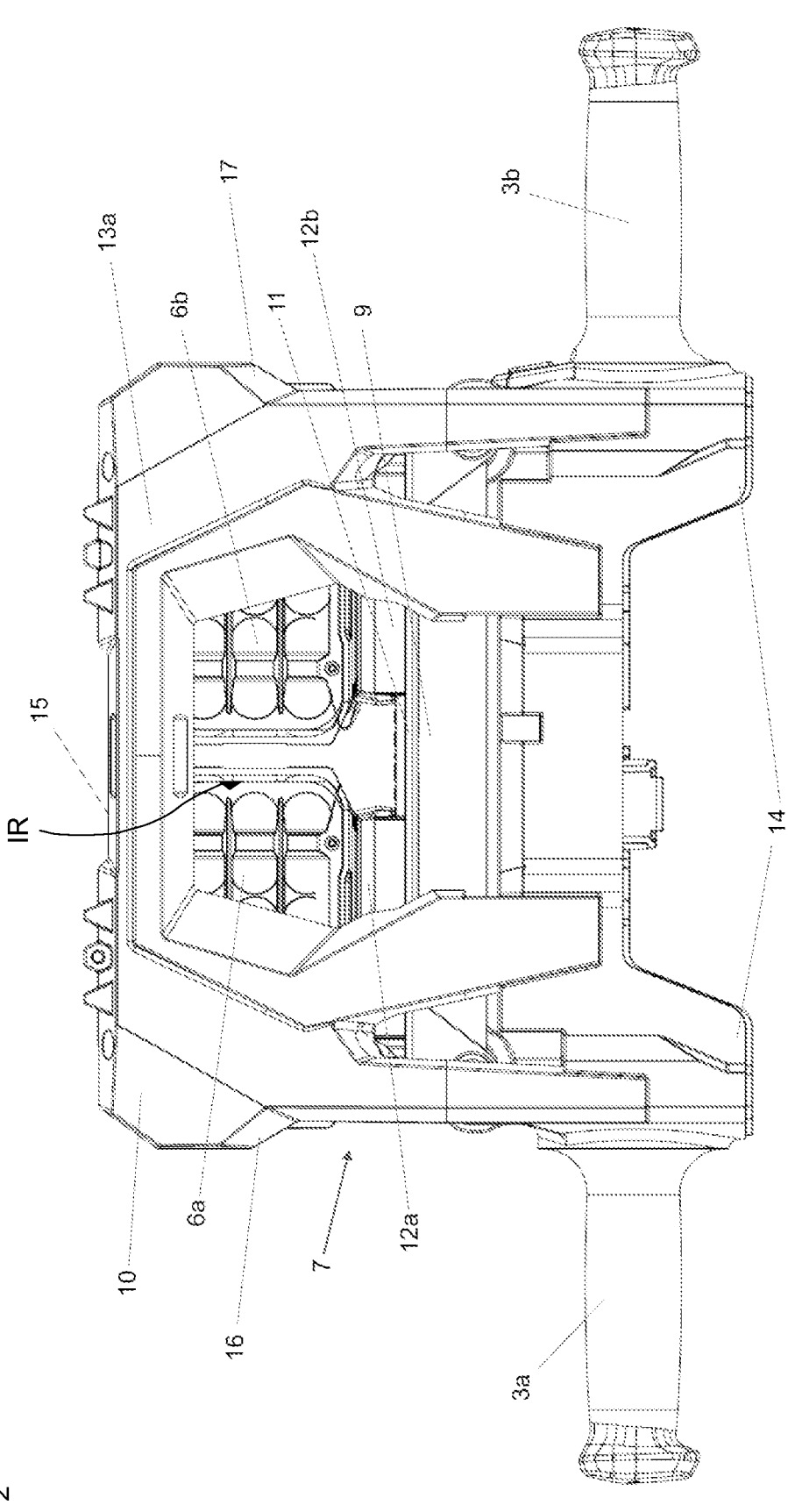
FIG. 2 shows a side view of an upper end of a housing of the power tool with a guard bracket.
Figure 4:
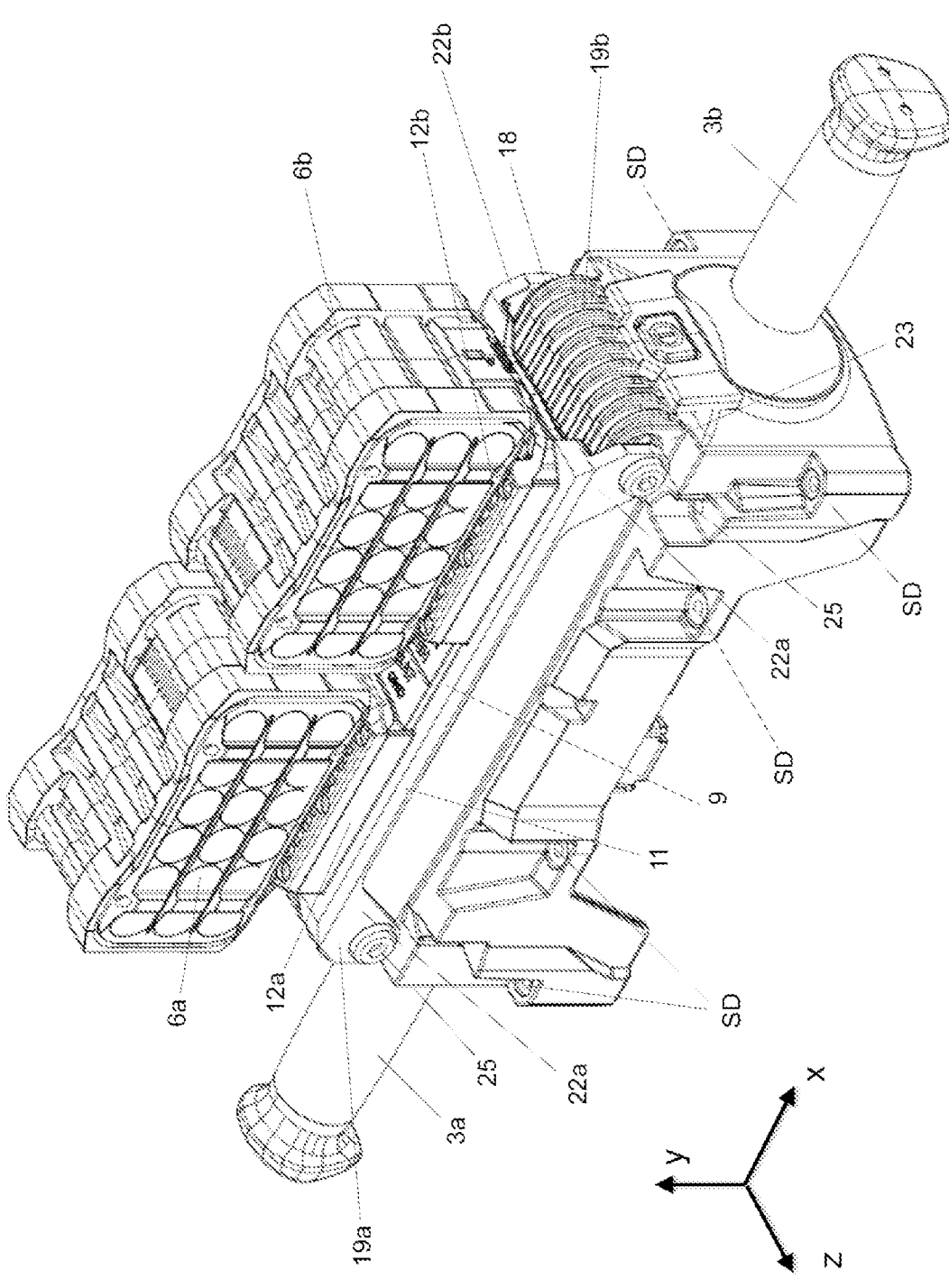
FIG. 4 shows a perspective view of the upper end of the housing of the power tool with an impact damping device and without the guard bracket.

Both the first and the second guard bracket 13*a*, 13*b* each have a first end 14, a second end 15, a left-hand end 16 and a right-hand end 17 (see, e.g., FIG. 2). The first end 14 of the first and second guard brackets 13*a*, 13*b* is positioned at the second end 2*b* of the housing 2 of the power tool 1. The first and second guard brackets 13*a*, 13*b* are in this case connected releasably to the housing 2 of the power tool 1 by screws. In FIG. 4, five of the total of eight screw holes or the screw domes SD for the screws for fastening the two guard brackets 13*a*, 13*b* to the housing 2 of the power tool 1 are illustrated. Each guard bracket 13*a*, 13*b* is fixed by four screws to the housing 2 of the power tool 1. According to an alternative configuration, it may also be possible for the first and/or second guard bracket 13*a*, 13*b* to be connected fixedly, i.e. inseparably, to the housing 2 of the power tool 1.

Figure 3:
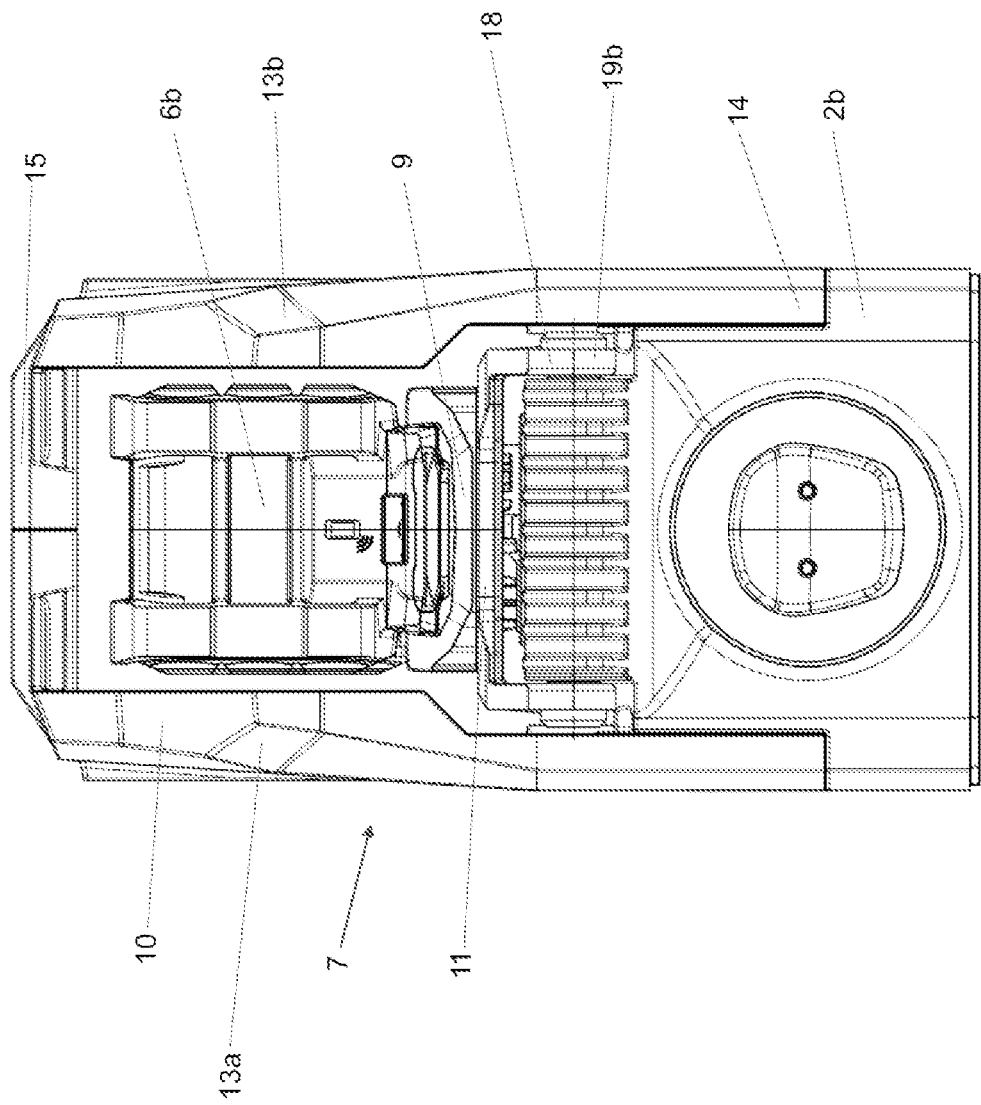
FIG. 3 shows a side view of the upper end of the housing of the power tool with the guard bracket.

The two guard brackets 13*a*, 13*b* are configured such that they are in contact at their second ends 15 and are connected together. As can be seen in FIG. 3, the two guard brackets 13*a*, 13*b* form a planar face at the second end 15. In an assembled state, i.e. when the two guard brackets 13*a*, 13*b* have been connected to the second end 2*a* of the housing 2 of the power tool 1, the two guard brackets 13*a*, 13*b* form a kind of cage with an interior space IR. The first and second rechargeable batteries 6*a*, 6*b* can be received in the interior space IR between the two guard brackets 13*a*, 13*b*.

Figure 5:
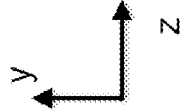
FIG. 5 shows a sectional view through the impact damping device.
Figure 5:
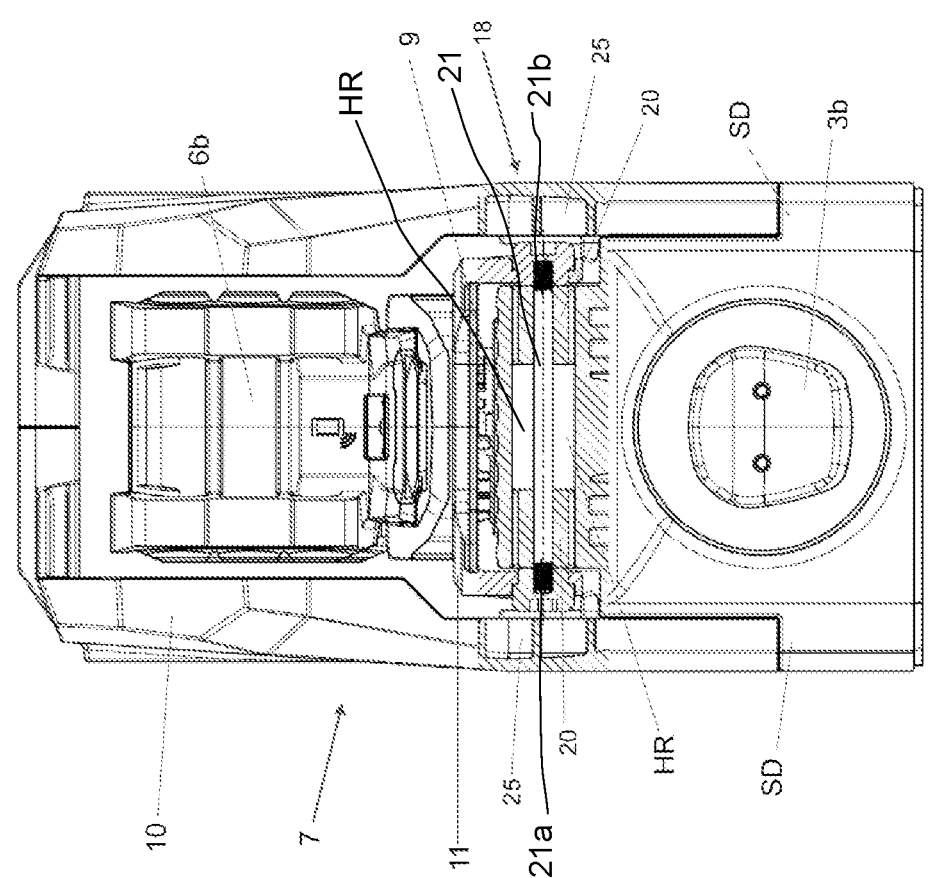

As is shown in particular in FIGS. 4 and 5, the battery interface device 9 is positioned at the second end 2*b* of the housing 2 of the power tool 1 (see, e.g., FIG. 1). As already indicated above, the battery interface device 9 is configured to connect the first and second rechargeable batteries 6*a*, 6*b* releasably to the housing 2 of the power tool 1. To this end, the first rechargeable battery 6*a* is pushed in the arrow direction X onto the first connection device 12*a* and the second rechargeable battery 6*b* is pushed counter to the arrow direction X onto the second connection device 12*b*.

A damping device 18 is positioned between the housing 2 of the power tool 1 and the battery interface device 9. The damping device 18 serves primarily to absorb impacts, shocks and other mechanical influences on the battery receiving apparatus 4. As illustrated in the figures, the damping device 18 has primarily a first and a second hinge element 19*a*, 19*b* and a damping element 20 (see, e.g., FIG. 4).

Each hinge element 19*a*, 19*b* contains a pin 21 and a first and second upper hinge band 22*a*, 22*b* and a lower hinge band 23. The two upper hinge bands 22*a*, 22*b* are connected to the base plate 11 of the battery interface device 9 in a manner spaced apart from one another and the lower hinge band 23 is connected to the second end 2*b* of the housing 2 of the power tool 1. In the present exemplary embodiment, the lower hinge band 23 is configured in the form of a continuous hinge chamber with a through-hole. The pin 21 is arranged horizontally in the arrow direction Z between the upper hinge bands 22*a*, 22*b* and the lower hinge band 23.

Figure 6:
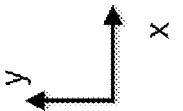
FIG. 6 shows a further sectional view through the impact damping device and a first and second rechargeable battery.
Figure 6:
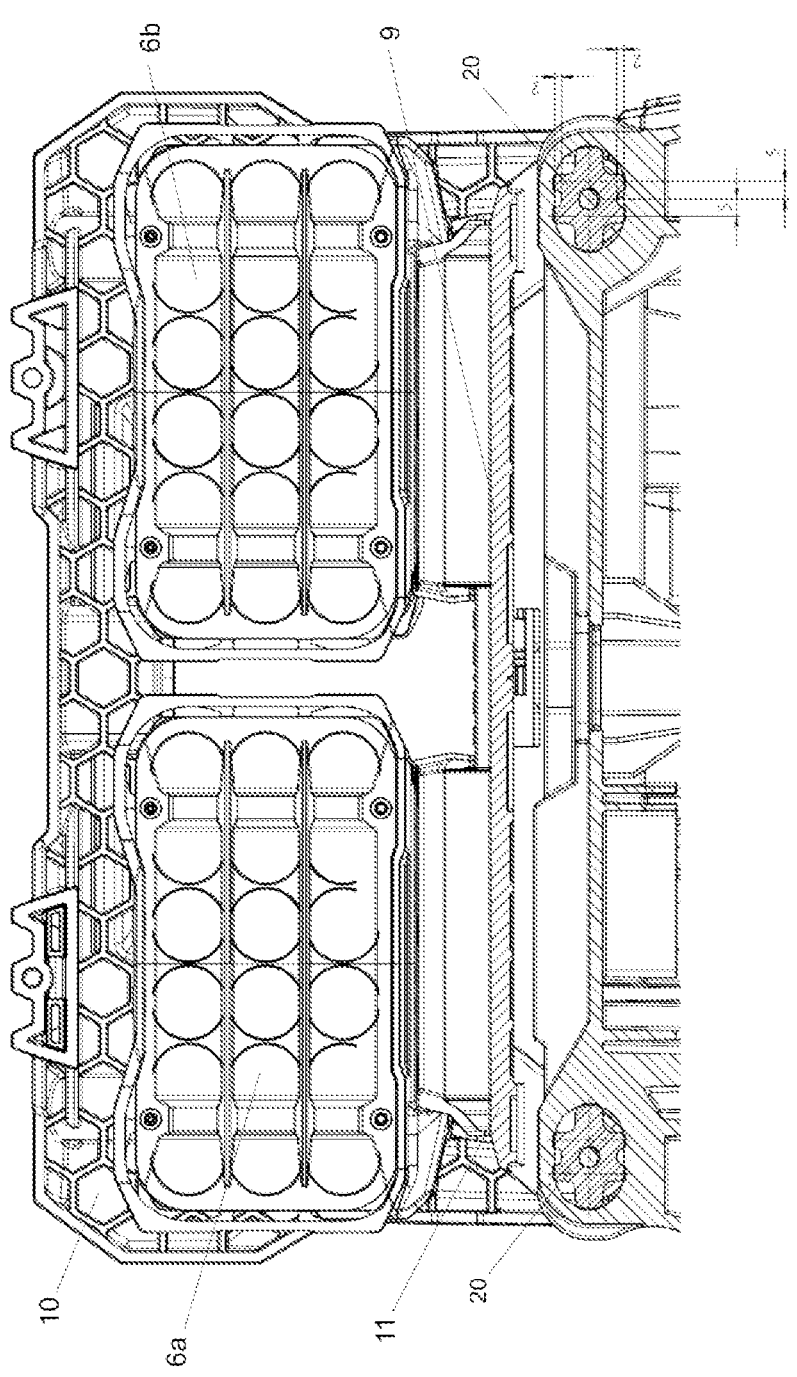
Figure 7:
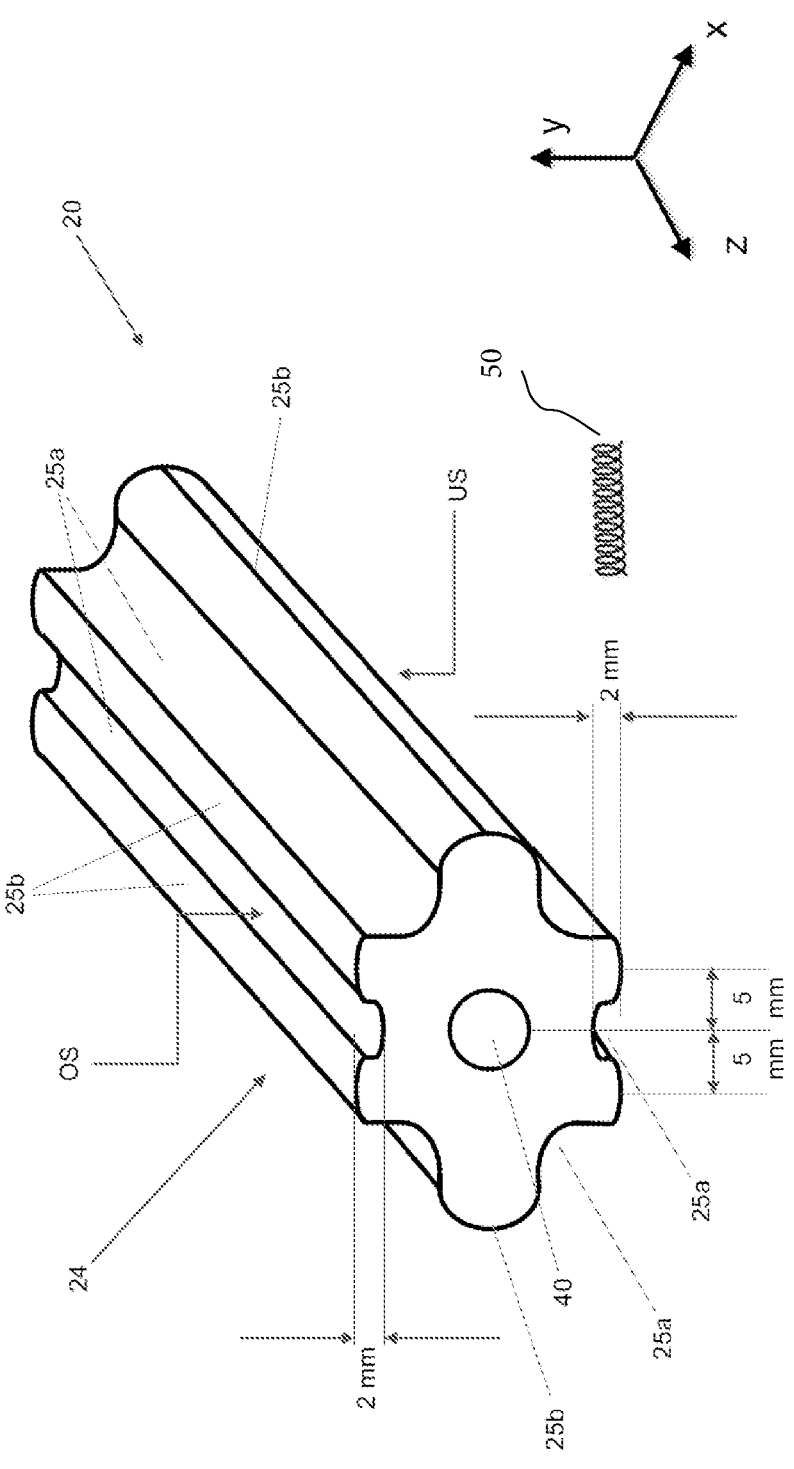
FIG. 7 shows a perspective view of a damping element.

The damping element 20 is configured in a cylindrical manner and has primarily an oval cross-sectional area with a central through-hole 40 (cf. FIG. 7). Furthermore, the damping element 20 consists of an elastic material, for example rubber. As is likewise shown in FIG. 7, the damping element 20 has, on an outer lateral surface 24, a number of axially extending grooves 25*a* and tongues 25*b*. In other words: a number of elevations 25*b* and recesses 25*a*. The grooves and recesses 25*a* can also be referred to as elongate cutouts. The multiplicity of grooves 25 along the outer lateral surface 24 of the damping element 20 have the effect that the damping element 20 exhibits increased elastic properties. As is apparent from FIGS. 6 and 7, the groove in the top side OS and in the underside US of the damping element 20 has a depth of 2 mm. The two tongues 25*b* on the top side OS and on the underside US are each at a distance of 10 mm from one another. The highest elevation of the tongue 25*b* is in this case 5 mm away from the deepest point of the groove 25*a*.

As is apparent in particular from FIG. 5, a first and second damping element 20 are positioned around the pin 21. The pin 21 is in this case introduced into the through-hole 40. The first and second damping elements 20 are identical in the configuration. The length of each damping element 20 in this case corresponds to approximately one third of the length of the pin 21. The first damping element 20 is positioned at the first end 21*a* of the pin 21 and the second damping element 20 is positioned at the second end 21*b* of the pin 21. Between the first and second damping elements 20, a clearance or cavity HR is left. The cavity HR serves for it to be possible for the first and second damping elements 20 to extend upon deformation.

According to an alternative embodiment of the damping device 18, it is possible that, instead of a first and second damping element 20, only one, continuous damping element is provided around the pin 21.

In order to keep the pin 21 in position between the upper and lower hinge bands 22*a*, 22*b*, 23 and to prevent the pin 21 and thus the damping elements 20 from dropping out of the damping device 18, a respective nut 25 is provided at the end 21*a*, 21*b* of the pin 21.

As a result of the elastic damping element 20 being positioned around the pin 21, it is possible for the upper hinge bands 22*a*, 22*b* to be able to move relative to the lower hinge band 23. Consequently, the battery interface device 9 can move relative to the housing 2 of the power tool 1. In other words: the battery interface device 9 is decoupled from the housing 2 of the power tool 1 by the damping device 18.

According to an alternative configuration of the damping device 18, the damping element 20 is configured in the form of a spring element, in particular of a coil spring element (shown solely schematically in FIG. 7 as 50).

The value of the spring constant for the damping element 20 should be chosen such that the deflection of the damping element 20 (i.e. of the spring) is at a minimum. A minimum deflection of the damping element 20 makes it possible to prevent an impact on the housing 2 of the power tool 1 (for example if the power tool falls over) from causing the rechargeable batteries 6a, 6b to shake and strike the substrate.

Example Calculation of a Minimum Deflection of the Damping Element:

$$E_{pot} \text{ spring} = \frac{1}{2} \times D \times s^2$$

$E_{pot}$ spring=potential energy of the spring or damping element
s=deflection of the spring or damping element
D=spring constant $$E_{pot} PT = m \times g \times h$$

$E_{pot}$ PT=potential energy of the power tool
m=mass of one or more rechargeable batteries
g=gravity=9.81 m/s$^2$
h=height from the ground to the battery position on the power tool $$\frac{1}{2} \times D \times s^2 = m \times g \times h$$

$$s = \sqrt{2 \times m \times g \times h / D}$$

Example: D=275 to 300 kN/m
s=5 mm

LIST OF REFERENCE SIGNS

1 Power tool
2 Housing
3a First handle
3b Second handle
5 Tool fitting
6a First rechargeable battery
6b Second rechargeable battery
7 Battery receptacle apparatus
8 Tool
9 Battery interface device
10 Battery fall protection device
11 Base plate
12a First connection device
12b Second connection device
13a First guard bracket
13b Second guard bracket
14 First end of the guard bracket
15 Second end of the guard bracket
16 Left-hand end of the guard bracket
17 Right-hand end of the guard bracket
18 Damping device
19a First hinge element
19b Second hinge element
20 Damping element
21 Pin
22a First upper hinge band
22b Second upper hinge band
23 Lower hinge band
24 Outer lateral surface
25a Axially extending groove
25b Tongue
25 Nut
40 Through-hole
50 Coil spring
HR Cavity
SD Screw holes
OS Top side of the damping element
US Underside of the damping element

What is claimed is:

1. A power tool comprising:
a housing;
a battery interface device for releasably connecting at least one rechargeable battery to the power tool; and
a damper device for absorbing and damping impacts acting on the at least one rechargeable battery, the damper contained between the housing and the battery interface device;
the damper device having a first hinge and a second hinge and a damper.

2. The power tool as recited in claim 1 wherein the damper device contains at least one damper arranged in a longitudinal extent perpendicularly to a working axis of the power tool.

3. The power tool as recited in claim 2 wherein the at least one damper is configured cylindrically with an oval cross-sectional area.

4. The power tool as recited in claim 2 wherein the at least one damper has at least one axially extending groove on an outer lateral surface.

5. The power tool as recited in claim 2 wherein the at least one damper at least partially contains an elastic material.

6. The power tool as recited in claim 2 wherein the at least one damper is configured in the form of a spring element.

7. The power tool as recited in claim 6 wherein the at least one damper is a coil spring element.

8. A chipping hammer comprising the power tool as recited in claim 1.

9. The power tool as recited in claim 1 wherein the damper device includes at least one damper configured cylindrically with an oval cross-sectional area.

10. The power tool as recited in claim 1 wherein the damper device includes at least one damper having at least one axially extending groove on an outer lateral surface.

11. The power tool as recited in claim 1 wherein the damper device includes at least one damper having at least partially an elastic material.

12. The power tool as recited in claim 1 wherein the damper device includes at least one damper having a spring element.

13. The power tool as recited in claim 12 wherein the at least one damper is a coil spring element.

14. The power tool as recited in claim 1 wherein the battery interface device has a first connector for receiving a first rechargeable battery and a second connector for receiving a second rechargeable battery.

15. The power tool as recited in claim 1 wherein the battery interface device contains a planar base plate.

16. The power tool as recited in claim 1 wherein the first hinge has a first pin and the second hinge has a second pin.

17. The power tool as recited in claim 16 wherein the first hinge has a first upper hinge band, a second upper hinge band, and a first lower hinge band, and the second hinge has a third upper hinge band, a fourth upper hinge band, and a second lower hinge band.

18. The power tool as recited in claim 17 where the first pin is arranged between the first upper hinge band, the second upper hinge band, and the first lower hinge band, and the second pin is arranged between the third upper hinge band, the fourth upper hinge band, and the second lower hinge band.

19. A power tool comprising:
a housing;
a battery interface device for releasably connecting at least one rechargeable battery to the power tool, the battery interface device containing a planar base plate, a first connector for receiving a first rechargeable battery, and a second connector for receiving a second rechargeable battery; and a damper device for absorbing and damping impacts acting on first and second rechargeable batteries, the damper contained between the housing and the battery interface device.

\* \* \* \* \*